H. M. PILKINGTON.
APPARATUS FOR PHOTOGRAPHICALLY REPRODUCING DESIGNS UPON SENSITIZED SURFACES.
APPLICATION FILED JULY 15, 1911. RENEWED NOV. 8, 1915.
1,186,034.
Patented June 6, 1916.
4 SHEETS—SHEET 2.
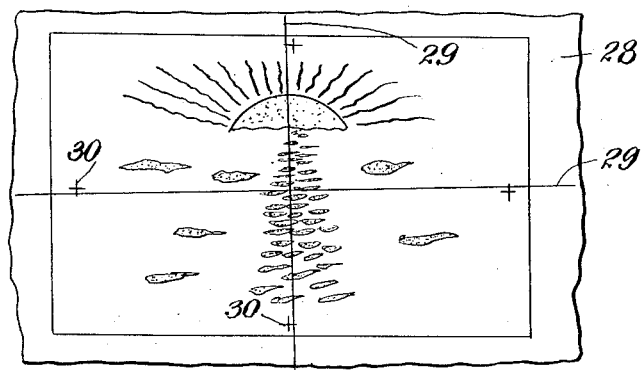
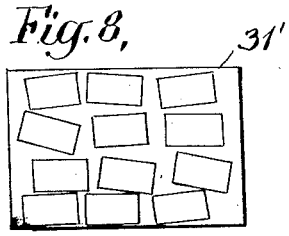
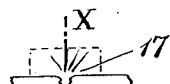
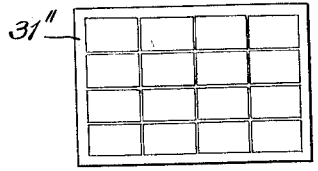
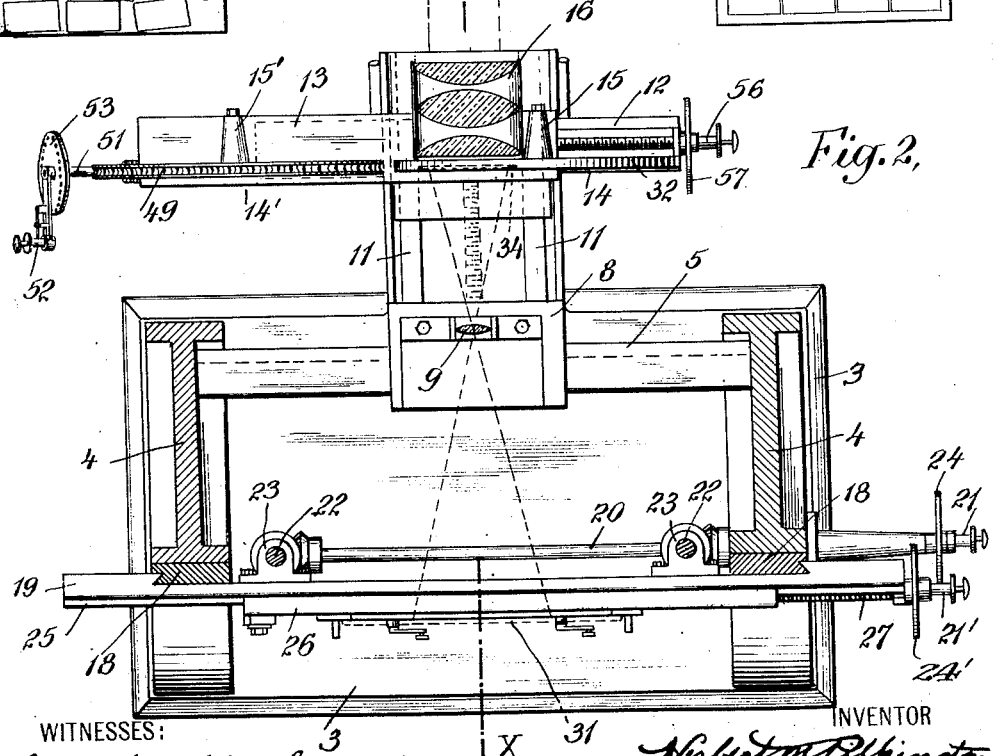

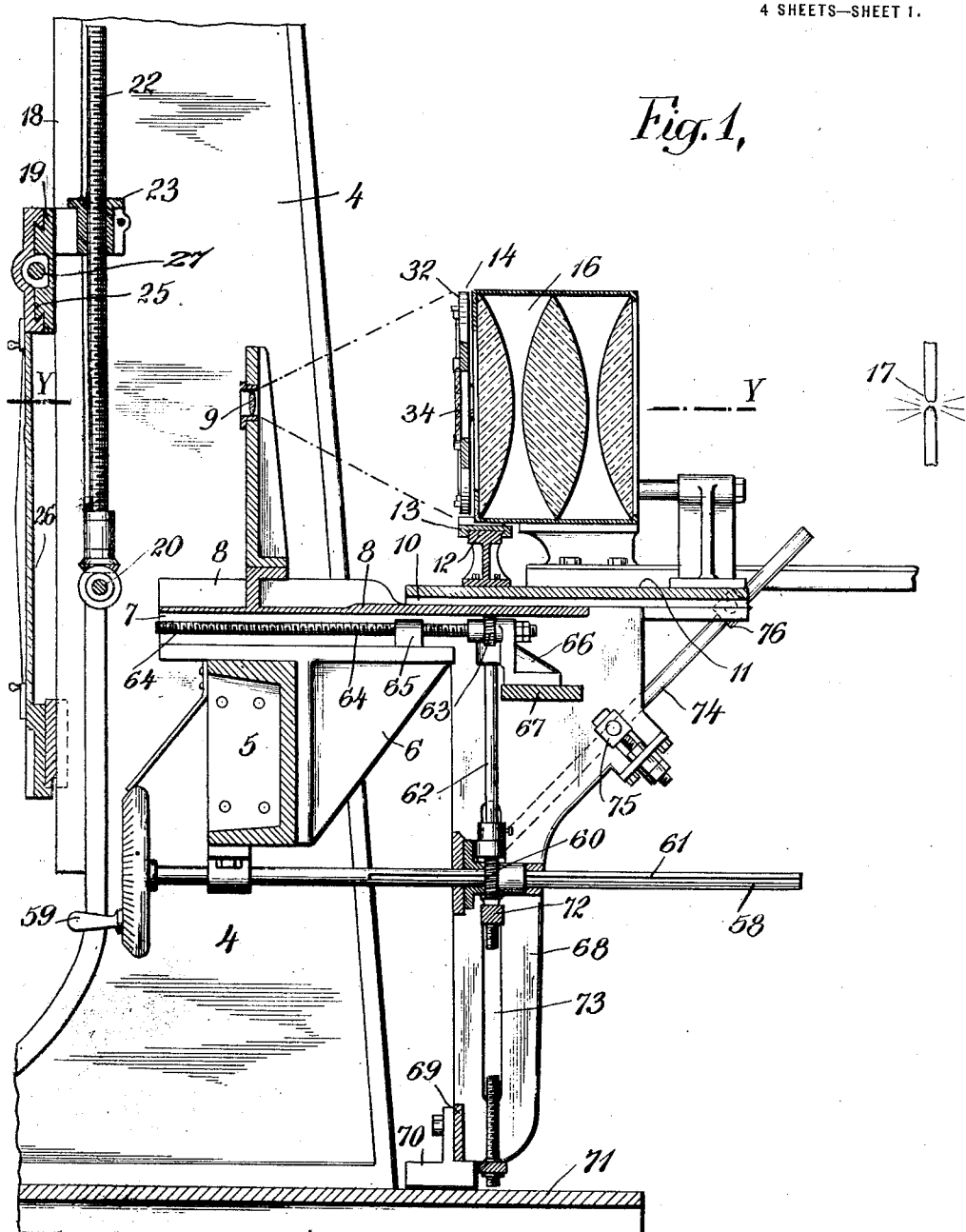

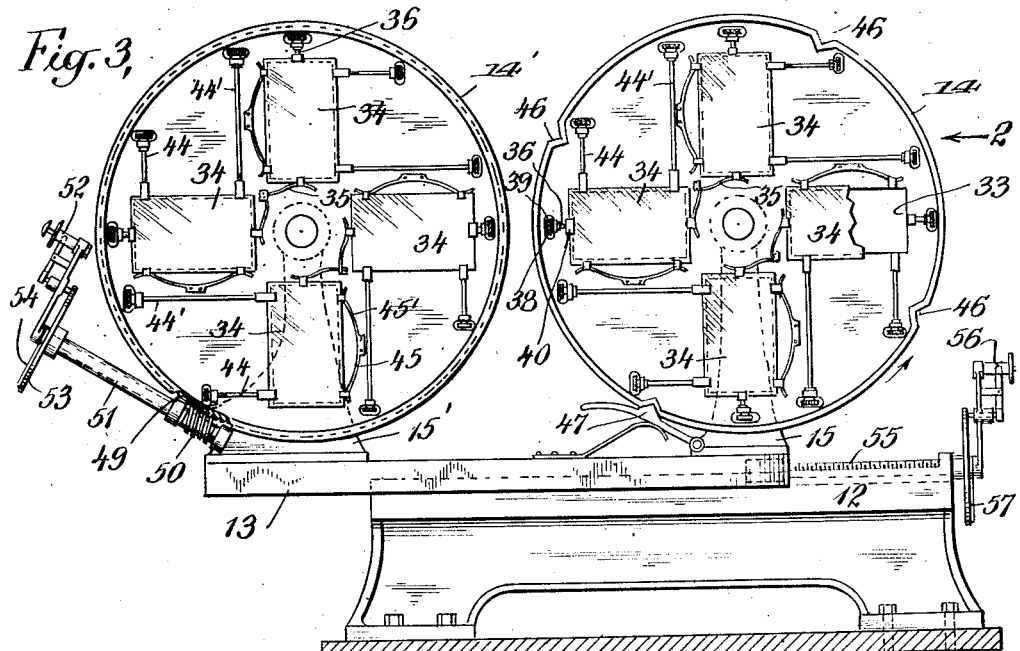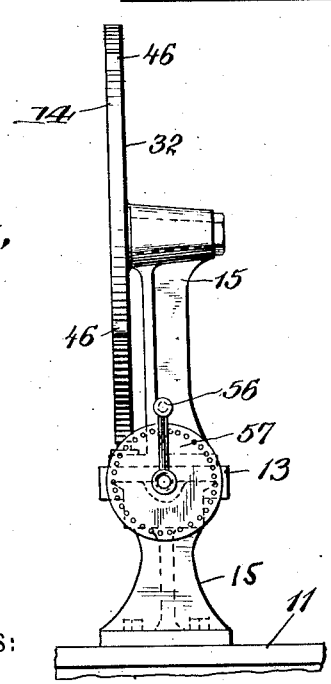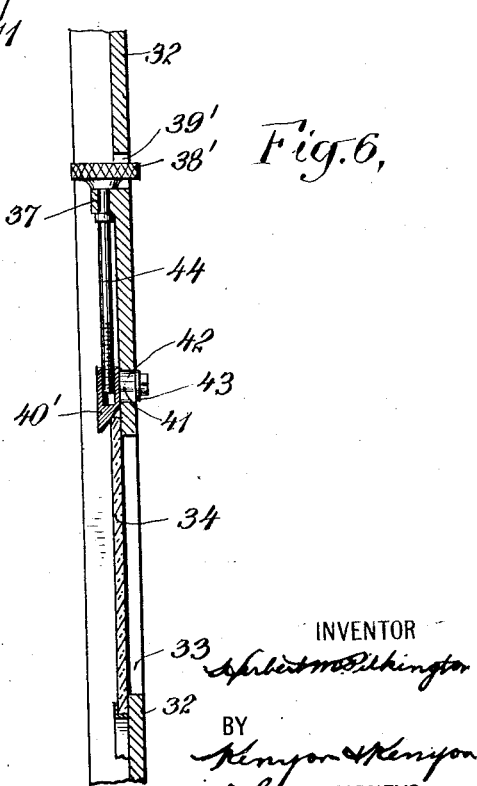

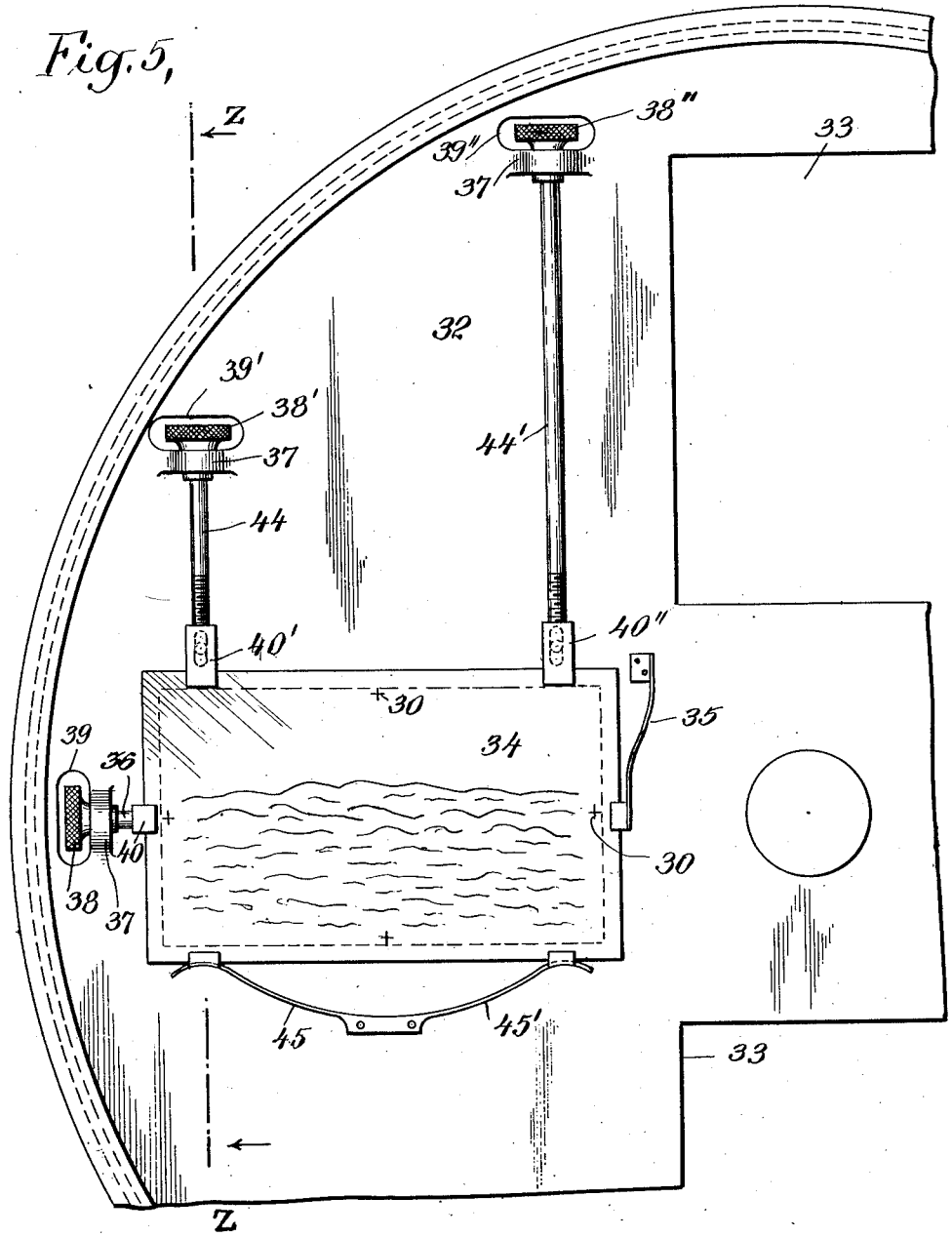

UNITED STATES PATENT OFFICE.

HERBERT M. PILKINGTON, OF ARVERNE, NEW YORK, ASSIGNOR, BY MESNE ASSIGNMENTS, TO LITHOTEX CORPORATION, OF NEW YORK, N. Y., A CORPORATION OF NEW YORK.

APPARATUS FOR PHOTOGRAPHICALLY REPRODUCING DESIGNS UPON SENSITIZED SURFACES.

1,186,034.	Specification of Letters Patent.	Patented June 6, 1916.

Application filed July 15, 1911, Serial No. 638,622. Renewed November 8, 1915. Serial No. 60,417.

*To all whom it may concern:*

Be it known that I, HERBERT M. PILKINGTON, a citizen of the United States, and a resident of Arverne, Long Island, in the county of Queens, State of New York, have invented certain new and useful Improvements in Apparatus for Photographically Reproducing Designs upon Sensitized Surfaces, of which the following is a specification.

My invention relates to photographic reproduction of designs upon sensitized surfaces, and more particularly to the reproduction of two or more different designs or subjects one or more times upon the same sensitized surface.

The object of the invention is to provide means whereby different designs or subjects contained on transparent plates may be reproduced photographically upon the same sensitized surface one or more times with accuracy, rapidity of operation and with economy of the sensitized surface used.

In reproducing two or more different designs or subjects one or more times upon a sensitized surface, it is necessary, for economy and efficiency of operation, that the different designs be so arranged and adjusted that when reproduced upon the sensitized surface, they will fall in regular rows, with each reproduction properly "squared" with respect to the others so that the different reproductions may be spaced apart a minimum distance from each other. And in the production of plates in making prints for multiple color work, each plate containing a number of reproductions of a design or of component parts of a design, it is important that the designs on each plate are so positioned thereon that the corresponding designs or components of the same design will register one with the other for the purpose of having the various colors of the resulting print or picture register or match up one with the other; and by means of this invention two or more different designs or component parts of two or more different designs may be reproduced and accurately spaced on such plates, so that the corresponding designs of the different plates will exactly match one with the other.

In attempting to photographically reproduce two or more different designs or subjects one or more times upon the same sensitized surface, I have found that it is necessary that the plates bearing the different designs or components of the same design, in the case of multiple color work, be adjusted so that the operator will know exactly in what relative positions the different images will fall upon the sensitized surface in order that he may determine what distances the sensitized surface must be moved past the lens at each step to properly space the images or reproductions thereon.

In order that the spacing distances shall be a minimum, it is necessary that the plates bearing the different designs be adjusted to coincide with respect to an object in space, which I will term a register indicator. By being adjusted to coincidence with respect to a register indicator, I mean that the different plates should be so adjusted that suitable registration marks placed thereon will coincide with suitable registration marks or lines on the register indicator, so that the plates, or the designs, as the case may be, will be "squared" with respect to each other and properly positioned vertically and horizontally.

Since the different design-bearing plates cannot be replaced and accurately adjusted once the photographic operation has commenced, nor the sensitized surface removed to project the different designs on a register indicator to determine the relative positions of the images, it is necessary for effective work that the different design-bearing plates be adjusted to coincidence before the photographic operation has commenced. It is also necessary that suitable means be provided to accurately step the sensitized surface past the lens predetermined distances in order to properly space the images thereon. Likewise, in making up two or more printing plates for multiple color lithographic work, each plate containing a component unit of each of a plurality of different designs or subjects, it is necessary that the plates bearing the different component units of the respective subjects or designs, be adjusted to coincidence with respect to a suitable register indicating means, so that when the printing surfaces, one of each color to be employed, are made up, each having a plurality of component units of the different subjects, the component units on one plate will exactly match on the print from the component units of the other plate so as to bring the components of each design into register to produce the proper color effect. By my invention, I am enabled to accomplish all of these desirable objects.

I will first briefly outline my invention without reference to the accompanying drawings which illustrate the preferred form of apparatus for carrying out the invention. I provide means for supporting a plurality of transparent plates on which are formed the different designs or components of the different designs to be reproduced, the support being arranged and constructed to bring each plate into position before the lens. Each plate is formed with a suitable register mark or marks, and in the preferred manner of using my invention, I place on each plate two or more marks, preferably crosses or circled dots, in vertical alinement, and two or more similar marks in horizontal alinement, which marks may be alined centrally of the plate or of the design space on the plate, so that lines drawn through the vertical and the horizontal marks will cross at the center of the plate or design space, as the case may be. I also provide suitable means with reference to which the different plates may be adjusted to coincidence, and suitable means for adjusting each plate to coincidence with respect thereto. In the preferred manner of using my invention, as a means for indicating the coincident adjustment of the different plates or design, I utilize a ground glass having hair lines thereon preferably crossed at right angles, along which lines the register marks can be made to coincide; but any suitable means by which the plates or designs could be accurately adjusted may be used instead of the focusing screen. I also provide a sensitized surface mounted to move step by step, preferably horizontally and vertically transverse to the lens, and I provide suitable means for accurately moving the sensitized surface predetermined distances at each step. I preferably further provide means for adjusting the relative distances of the lens and the multiple plate holder from the sensitized surface in such a way as to always maintain the plates and the sensitized surface in the conjugate foci of the lens. The multiple plate holder is also provided with means for determining the different positions of the holder or frame at which the different plates or designs will be brought in their formerly adjusted positions before the lens. After adjusting the plates to coincidence with reference to the focusing screen or other suitable register indicator, I then make one or more projections of one of the designs or subjects upon the sensitized surface, stepping the surface past the lens between exposures the distance of the width or height of the projected image, as the case may be, until the desired number of images have been printed on the sensitized surface; then a second design plate is brought into accurate position before the lens and a suitable number of exposures of this design are made as before, the sensitized surface being moved a predetermined distance between successive exposures to accurately space the reproductions of the unit designs on the sensitized surface just the desired distance to enable proper separation of the prints to be made therefrom.

My invention will be more fully understood by reference to the accompanying drawings illustrating my preferred form of machine, in which—

Figure 1 is a longitudinal sectional elevation on line $x$—$x$ of Fig. 2; Fig. 2 is a sectional plan view, taken on line $y$—$y$ of Fig. 1; Fig. 3 shows an enlarged front elevation of a pair of multiple plate holders, as used in the machine shown in Figs. 1 and 2; Fig. 4 is an end elevation of the plate holders looking in the direction of arrow 2 of Fig. 3. Fig. 5 is an enlarged view of a portion of one of the multiple holders or frames showing one of the plates having a design and also suitable registration marks thereon; and also showing the preferred means for adjusting the plate in position on its holder; Fig. 6 is a cross sectional view taken on line $z$—$z$ of Fig. 5, showing the manner of gripping the plates in position on the holder; Fig. 7 shows a component unit of a design as projected on the focusing screen before adjustment, the other component of the complete design being shown in Fig. 5; Fig. 8 shows several rows of two or more different subjects or designs as they would appear if projected upon the sensitized surface without utilizing the present invention; and Fig. 9 shows how the reproductions would appear upon the sensitized surface when projected according to the invention.

Referring to the drawings, 3 is a base having two uprights 4 connected by a cross piece 5 (Figs. 1 and 2) which supports a bracket 6 having a guideway 7 on which is mounted a sliding frame 8 carrying a lens 9. This sliding frame is provided with a longitudinal guideway 10 on which is mounted a second sliding frame 11 having a transverse guideway 12 on which is mounted a slide 13 carrying one or more multiple plate holders or frames 14, 14' which are preferably rotatively mounted upon standards 15, 15'. A suitable set of condensing lenses 16 and an adjustably mounted lamp 17 may also be mounted upon the sliding frame 11, as shown.

The front face of each of the uprights 4, 4 carries a vertical guideway 18 on which is mounted a sliding carriage having a cross piece 19, the carriage being moved up and down on the guideways 18, 18 by means of a horizontal shaft 20 operated by a crank handle 21 and geared to two vertical parallel screws 22 mounted upon the uprights and operating in threaded nuts 23 secured to the back of the vertical carriage. The horizontal shaft is provided with a suitable indicator dial 24 by means of which the predetermined distances, through which the carriage is to be moved vertically, can be accurately determined.

The cross piece 19 is provided with a guideway 25 along which is moved a second carriage 26 by means of a horizontal screw 27 also equipped with a crank handle and dial as above described. The second carriage 26 is adapted to support a focusing screen 28 (Fig. 7), which is one form of what I have termed a register indicator, which screen has suitable marks or cross lines 29 formed thereon upon which the different designs with their registration marks 30 can be projected and adjusted to coincidence.

When all the design plates have been adjusted as hereinafter explained, then the screen or other register indicator is replaced by a suitable sensitized surface 31 which may be accurately stepped past the lens at predetermined distances to space the images of the different designs thereupon.

The multiple holder or frame 14 is shown in the form of a disk 32 having a plurality of openings 33 for the transparent design plates 34. The disk is equipped at each opening with suitable means for adjusting the plates in and out, crosswise, and for "squaring" them. In the present machine, this means consists of a spring 35 at the inner end of each opening, which springs tend to move the plates outward against the movement of adjusting screws 36 (Figs. 3, 5 and 6). The screws are supported in lugs 37 near the periphery of the disk, and are provided with enlarged heads 38 extending through openings 39 to the other side of the disk so that the screws may be manipulated by gripping them between the thumb or fore finger on either side of the disk. The ends of the screws are provided with beveled followers 40 threaded thereon (Fig. 6) and held in position by means of lateral screws 41 projected through slots 42 which are bridged by washers 43. Each opening is also provided with two adjusting screws 44, 44' mounted in lugs 37 and being arranged, constructed and operated similarly to the screws 36, except that they are of different lengths so that the heads may be positioned near the periphery of the disk. The movement of the plate by these screws is opposed by two springs 45, 45' which are preferably made integrally in the form of a bow and secured at the center to the disk. By this arrangement, adjustment of the plate in any direction may be obtained with a minimum number of adjusting screws and in a manner which greatly facilitates the speed of adjusting the different plates, since all of the screws may be manipulated with one hand at the periphery of the disk, and the operator may be manipulating each of the screws 44, 44' at the same time, which greatly facilitates the "squaring" of the plate. The double or bow spring 45, 45', while opposing the action of the adjusting screws 44, 44', also permits the plate to be rocked so as to "square" the same.

As a convenient means for determining the positions of the disk at which the respective plates are brought into their formerly adjusted position before the lens, I have provided a series of notches 46 in the periphery of the disk, which engage a spring-pressed ratchet stop 47, the notches and stop being arranged to engage at such points as will bring the different plates into position before the lens. In this way, as each plate is adjusted and rotated out of position for the next plate to be brought up and adjusted and then subsequently brought back into position before the lens for the purpose of projecting the design, by the engagement of these notches with the stop, each plate will be brought into exactly the position in which it was formerly adjusted.

In Fig. 3, I have shown a plurality of disks 14, 14' mounted on the transverse slide 13, the disk 14' being arranged and constructed substantially like disk 14 except that, instead of providing the position-determining means in the form of a stop, I provide a worm wheel 49 on the periphery of the disk, which engages with a worm 50 on shaft 51, which is operated by crank handle 52, and provided with a suitable index head 53 carrying a marker 54, so that the distance through which the disk is moved may be determined by counting the number of revolutions and fractions of a revolution of the shaft 51, by means of the dial 53. By having a plurality of disks on the horizontal slide 13, I am enabled to adjust twice as many designs or plates to coincidence where it is desired to project a great number on the same sensitized surface. Where such work is desired, if a plurality of disks or frames were not provided, the disk would have to be large enough to carry the required large number of plates, and on account of the arrangement and construction of the apparatus, this would require enlarging other portions of the machine, thus greatly increasing the first cost of installation and requiring a greater amount of time in the adjustment of the different plates.

The two disks 14 and 14' may be moved into position so as to bring their respective plates in accurate position before the lens by means of a horizontal screw 55 operating in a nut, 55', on slide 13, the screw being provided with a crank handle 56 and having a suitable indicating dial 57 similar to the indicating dials 21 and 53 above mentioned.

In order that the slide 8 carrying the lens, and the slide 11 carrying the multiple plate holders 14, 14', may be adjusted along the line of projection so as to vary the size of the image on the sensitized surface, while always maintaining the sensitized surface and the design plates in the conjugate foci of the lens, I have adopted the following mechanism, which I will only refer to briefly, as the same is fully shown and described in United States Letters Patent Number 1,131,631, granted March 9, 1915, upon an application filed by me on June 14, 1911, for step and repeat machine, Serial Number 633,196. A horizontal shaft 58, which is operated by a crank handle 59, is provided with a worm wheel 60 having a feather engaging a slot 61 in the shaft, and this worm wheel meshes with two worm wheels one on each of a pair of parallel vertical shafts 62 which, at their upper ends, carry worm wheels which mesh with a worm wheel 63 keyed to a horizontal screw 64, which in turn operates in a threaded nut 65 secured to the main bracket 6. The screw 64 is journaled in a bracket 66 secured to a cross web 67 connecting two side pieces 68 projecting from the slide 8. The lower ends of these side pieces 68 are held together by a cross piece 69 to which is secured a shoe 70 sliding on a guideway 71. The two vertical shafts 62 are provided with threads below the worm wheel 60, and these threads engage threaded nuts in a cross piece or yoke 72, the outer ends of which travel up and down in guideways 73. To each outer end of this yoke is pivoted a rod 74 which passes through an adjustable fulcrumed sleeve 75. These rods are connected at their upper ends to the sliding frame 11 by means of sleeves 76. By this arrangement when the handle 59 is turned, shaft 58 through worm wheel 60 and the vertical shafts 62 and the horizontal screw 64, moves the slide 8 back and forth on the guideways 7 and 71, and at the same time, the yoke 72 traveling up and down on the threads of the vertical shafts 62, draws the inclined rods 74 back and forth through their fulcrumed sleeves 75, thus throwing the upper ends of the rods in or out according to the movement of the handle 59, to move the slide 11 simultaneously with the slide 8 so as to maintain the relative positions of the lens and the multiple plate holders with respect to the sensitized surface, such that the sensitized surface and the plate holders will be maintained in the conjugate foci of the lens.

The operation of the machine is as follows: The register indicating means which, in this case, I have shown in the form of a screen 28 having hair lines formed thereon at right angles, is placed in the holder on the carriage 26, which is moved in position by means of the crank handles 21—21' so as to bring the intersection of the hair lines 29 before the lens. The transparent plates 34 bearing the different designs or subjects or components of designs, together with suitable registration marks, such as the four crosses 30 shown, are then placed upon the multiple holders 14, 14' in the following manner. The handle 56 is rotated to bring the standard 15 of disk 32 into a predetermined position at which the different openings 33 on disk 32 will be brought into position before the lens when the disk is rotated. The disk 32 is then rotated into position where one of the notches 46 is engaged by the ratchet stop 47 so as to bring one of its openings in alinement with the lens 9, whereupon one of the plates is inserted and held in position by the clips on the springs 35 and 45—45', and by the beveled followers 40, 40' and 40'' on the different screws 36, 44 and 44'. The screws are then operated by the thumb and forefinger in the manner described to adjust the plate in and out, or crosswise, or to rock it in position as may be found necessary, in order to make the register marks 30 exactly coincide with or fall upon the hair lines 29 of the screen 28. This plate being adjusted, the disk 32 is rotated to bring the next notch into engagement with the stop, whereupon the succeeding opening will be in position before the lens and the next plate will be adjusted in this opening, and so on until the desired number of plates have been adjusted with respect to the register indicating means. If the desired number of designs should be greater than the openings in the right-hand disk 32, then the handle 56 is again turned to move the slide 13 in a predetermined position at which, when the left-hand disk is rotated, its different openings will move into alinement with the lens. The disk having been thus positioned, and knowing the exact number of turns and fraction of a turn necessary to move the disk the distance between plate centers, the plates may be adjusted in position as explained in regard to disk 32, and the disk rotated by turning crank handle 52 so as to bring the respective openings into position before the lens. Having thus adjusted the plates of both disks, the handle 56 is again rotated to move slide 13 to bring disk 32 back into its operative or adjusted position with respect to the lens. The carriage 26 is then moved to bring one of the corners of the screen in position before the lens and one of the designs is then projected upon the screen to properly position it thereon. The handle 59 is then rotated to move the slides 8 and 11 back and forth in a manner previously described, so as to adjust the image of the design as thrown upon the screen, to the desired size, whereupon suitable markers on the indicating dials 24—24' are set, or suitable stops along the path of the carriage may be set as described in my aforementioned United States Letters Patent Number 1,131,631. Then the screen is removed and a sensitized surface 31 is placed in the holder on carriage 26, and an image of the design then in position is projected upon the sensitized surface. Knowing the number of turns of the handle 21' necessary to move the carriage a given distance, and knowing the width of the projected image, the carriage is then moved horizontally the width of the image, or a little greater, if desired, and a second image of the design, or an image of one of the other designs, is projected, as desired, and the carriage again moved, and so on, until a complete row of images of one or more of the designs has been made, at which time the sensitized surface may be moved vertically by rotating crank handle 21, and a second row of images of one or more of the other designs projected on the screen as above explained, until the screen is filled with the desired number of the designs, as shown in Fig. 9; the positions of the different designs being determined by the notches on the disk 32.

If it is desired to utilize more designs than are contained on the disk 32, then disk 32' on the left may be brought into position as above explained, and the designs thereon projected upon the sensitized surface similarly as described with respect to those on disk 32.

While I have described my invention with particularity in connection with what I believe to be the best form of the invention now known to me, it is obvious that, in so far as certain broad features of the invention are concerned, they may be embodied in much simpler machines for doing less accurate or different kinds of work, and I do not wish to be understood as limiting some of the broad features of my invention to their use in connection with automatic focusing means, or step and repeat apparatus as shown in the accompanying drawings, nor to the use of a single focusing lens or a unitary register indicator upon which all of the designs are adjusted, or to the use of rotatively mounted plate holders.

But having thus described my invention, what I claim as new and desire to secure by Letters Patent, is:—

1. In photographic apparatus for reproducing designs upon sensitized surfaces, the combination of a holder for a sensitized surface, means for supporting a plurality of plates having designs to be reproduced on said surface, said means being movable to bring each plate into position to have its design projected on said surface, and means for producing lateral movement between the surface and plate-supporting means transverse to the line of projection.

2. In photographic apparatus for reproducing designs upon sensitized surfaces, the combination of a lens, a holder for a sensitized surface, a frame provided with a plurality of holders for plates having designs to be reproduced on said surface, said frame being movable to bring each plate into position before the lens, each of said holders being provided with means for individually adjusting its plate in any direction in its plane, and means for producing lateral movement between the surface and plate-holding frame transverse to the line of projection.

3. In photographic apparatus for reproducing designs upon sensitized surfaces, the combination of a holder for a sensitized surface, a carrier for a plurality of plates bearing designs to be reproduced, said carrier being movable to bring the different plates into a given position before the sensitized surface, means for separately adjusting the plates on the carrier when at such position, relative to a point in space, and means for bringing the carrier accurately to positions at which the adjusted plates will coincide with respect to a point in space.

4. In photographic apparatus for reproducing designs upon sensitized surfaces, the combination of a lens, means for supporting a plurality of plates having designs to be reproduced, said means being movable to bring each plate into position before the lens, means for adjusting each plate on its support in at least two directions at angles to each other and in the plane of the plate, and means for determining the position at which the supporting means is stopped to bring the successive plates in their formerly adjusted positions.

5. In photographic apparatus for reproducing designs upon sensitized surfaces, the combination of a register indicator, a holder for a sensitized surface, means for supporting a plurality of plates bearing designs to be reproduced on said surface, said means being movable to bring each plate into operative position before the surface, and means for individually adjusting the plates to coincidence with respect to the register indicator.

6. In photographic apparatus for reproducing designs upon sensitized surfaces, the combination of a lens, a register indicator, a holder for a sensitized surface, a multiple plate holder movable to bring successive plates held thereon into position between the lens and sensitized surface, and means for individually adjusting the plates to coincidence with respect to the register indicator.

7. In photographic apparatus for reproducing designs upon sensitized surfaces, the combination of a holder for a sensitized surface, a lens, a carrier for a plurality of plates bearing designs to be reproduced, said carrier being movable to bring the plates into position before the lens, means for separately adjusting the plates on the carrier when at such position, relative to a point in space, means for accurately resetting the carrier to the positions which it assumed when the plates were adjusted thereon, and a lamp for projecting the designs.

8. In photographic apparatus for reproducing designs upon sensitized surfaces, the combination of a holder for a sensitized surface, a register indicator, means for supporting a plurality of plates bearing designs to be reproduced, said means being arranged and constructed to bring each plate into operative position before the sensitized plate, means for individually adjusting the plates on their support to coincidence with respect to the register indicator, and means for determining the position of different parts of the supporting means to bring the plates into their formerly adjusted positions.

9. In photographic apparatus for reproducing designs upon sensitized surfaces, the combination of a lens, a register indicator, a multiple plate holder arranged to be moved so as to bring successive design plates held thereon into position before the lens, means for individually adjusting the plates so that the designs thereon will be coincident with respect to the register indicator, and a stop for determining the different positions of the multiple plate holder at which the plates are brought into their formerly adjusted positions before the lens.

10. In photographic apparatus for reproducing designs upon sensitized surfaces, the combination of a lens, a register indicator, a holder for a sensitized surface, a frame having a plurality of openings for receiving plates having designs to be reproduced on said surface, said frame being mounted so as to bring the different openings into position before the lens, means at each opening for individually moving the plate up and down, crosswise and for rocking it, to adjust the plates in their openings to coincidence with respect to the register indicator, and means for producing lateral movement between the surface and plate-holding frame transverse to the line of projection.

11. In photographic apparatus for reproducing designs upon sensitized surfaces, the combination of a lens, a register indicator, a frame having a plurality of openings for receiving plates having designs to be printed, said frame being mounted to move so as to bring the different openings into position before the lens, means at each opening for individually moving the plate up and down, crosswise and for rocking it, to individually adjust the plates in their openings coincident with respect to the register indicator, and means for determining the positions of the frame to bring the successive openings into accurate position before the lens.

12. In photographic apparatus for reproducing designs upon sensitized surfaces, the combination of a lens, a holder for a sensitized surface, a rotative frame mounted eccentric to the lens and having openings for a plurality of design-bearing plates, the openings being arranged to successively come into position before the lens when the frame is rotated, means for producing lateral movement between the surface and plate-holding frame transverse to the line of projection, and means for individually adjusting the different plates back and forth and crosswise in their respective openings.

13. In photographic apparatus for reproducing designs upon sensitized surfaces, the combination of a holder for a sensitized surface, a lens, a focusing screen having register marks thereon, a frame adapted to carry a plurality of transparent plates each having a design thereon to be reproduced, said frame being movable to bring each plate into position before the lens, means for individually adjusting the plates to coincidence with respect to the register marks on the focusing screen, and means for determining the positions of the frame to bring the different plates into their formerly adjusted positions before the lens.

14. In photographic apparatus for reproducing designs upon sensitized surfaces, a multiple plate holder comprising a frame having a plurality of openings for the plates and openings adjacent the outer edges thereof, two or more adjusting screws at each opening for adjusting the plates, and operating heads on said screws located in openings in the frame adjacent the outer edge thereof.

15. In photographic apparatus for reproducing designs upon sensitized surfaces, a multiple plate holder comprising a flat disk having a plurality of openings therein for photographic plates, two or more adjusting screws at each opening for engaging the plates, the screws being provided with thumb-operated heads, and said disk having openings adjacent its periphery in which said heads are located.

16. In photographic apparatus for reproducing designs upon sensitized surfaces, the combination of a holder for a sensitized surface, a register indicator having a plurality of lines arranged at an angle to each other, means for supporting a plurality of plates bearing designs to be reproduced upon the surface, said means being arranged and constructed to move each plate into operative position before the sensitized surface, means for individually adjusting the plates on their holder to coincidence with respect to the lines on the register indicator, and means for producing lateral movement between the surface and plate-supporting means transverse to the line of projection.

17. In photographic apparatus for reproducing designs upon sensitized surfaces, the combination of a holder for a sensitized surface, a plurality of supports each having a plate holder thereon for receiving a plate bearing a design to be reproduced on said surface, said supports being movable to bring the different plates into a given position before the sensitized surface to have their designs projected on said surface, means for separately adjusting the plates on their supports when at such positions, relative to a point in space, and means for producing relative movement between the plate supports and the holder for the sensitized surface through predetermined distances transverse to the line of projection, whereby different designs may be reproduced and accurately spaced upon a sensitized surface.

18. In photographic apparatus for reproducing designs upon sensitized surfaces, the combination of a holder for a sensitized surface, a plurality of supports each having a plate holder thereon for receiving a plate bearing a design to be reproduced on said surface, said supports being movable to bring the different plates into a given position before the sensitized surface to have their designs projected on said surface, means for separately adjusting the plates on their supports when at such positions, relative to a point in space, means for determining the positions of the supports at which the plates are brought into their formerly adjusted positions, and means for producing relative movement between the plate supports and the holder for the sensitized surface through predetermined distances transverse to the line of projection, whereby different designs may be reproduced and accurately spaced upon a sensitized surface.

19. In photographic apparatus for reproducing designs upon sensitized surfaces, the combination of a lens, a holder for a sensitized surface, a plurality of supports each having a plate holder thereon for receiving a plate bearing a design to be reproduced on said surface, said supports being movable to bring the different plates into position before the lens for the projection of their designs, a register indicator, means for adjusting the plates when in such position to coincidence with reference to the register indicator, and means for producing relative movement between the plate supports and the holder for the sensitized surface through predetermined distances transverse to the line of projection, whereby different designs may be reproduced and accurately spaced upon a sensitized surface.

20. In photographic apparatus for reproducing designs upon sensitized surfaces, the combination of a holder for a sensitized surface, register indicating means, a frame for carrying a plurality of transparent plates having designs to be reproduced upon the sensitized surface, said frame being movable to successively bring each plate into operative position before the sensitized surface to be projected thereon, means for adjusting the plate to coincidence with respect to the register indicating means, and means for producing relative movement between the plate supports and the holder for the sensitized surface through predetermined distances transverse to the line of projection, whereby different designs may be reproduced and accurately spaced upon a sensitized surface.

21. In photographic apparatus for reproducing designs upon sensitized surfaces, the combination of a lens, a holder for a sensitized surface, a register indicator, a frame for carrying a plurality of transparent plates having designs to be photographed upon the sensitized surface, said frame being movable to successively bring each plate into position before the lens for projection of its design, means for adjusting the plates to coincidence with reference to the register indicator, and means for stepping the sensitized surface holder past the lens predetermined distances transverse to the line of projection, whereby two or more different designs or subjects may be reproduced and accurately positioned upon a sensitized surface.

22. In photographic apparatus for reproducing designs upon sensitized surfaces, the combination of a holder for a sensitized surface, register indicating means, a frame for carrying a plurality of transparent plates having designs to be reproduced upon the sensitized surface, said frame being movable to successively bring each plate into operative position before the sensitized surface to be projected thereon, means for adjusting the plates to coincidence with respect to the register indicating means, and means for accurately stepping the sensitized surface holder predetermined distances transverse to the line of projection between exposures, whereby two or more different designs or subjects may be reproduced and accurately spaced upon a sensitized surface.

23. In photographic apparatus for reproducing designs upon sensitized surfaces, the combination of a lens, a holder for a sensitized surface, a register indicator, a frame for carrying a plurality of transparent plates having designs thereon to be photographed upon the sensitized surface, said frame and sensitized surface holder being arranged in the conjugate foci of the lens, said frame being movable to successively bring each plate in position before the lens, means for adjusting the plates to coincidence with reference to the register indicator, means for adjusting the relative positions of the lens and frame from the sensitized surface holder while maintaining the focus, and means for stepping the sensitized surface holder past the lens predetermined distances, whereby two or more different designs or subjects may be rapidly reproduced in sharp outline and accurately positioned upon a sensitized surface.

24. In photographic apparatus for reproducing designs upon sensitized surfaces, the combination of a holder for a sensitized surface, a plurality of frames each for carrying a plurality of plates having designs thereon to be photographed upon the sensitized surface, means for adjusting each plate on its holder, a support for each frame, said supports being movable to bring each frame into operative position at which its successive plates may be brought into position to be projected upon the sensitized surface, means for determining the operative position of each frame support, each frame being movably mounted on its support to bring its different plates into operative position, and means for determining the positions of the frames upon their supports at which the plates are brought into their formerly adjusted positions.

25. In photographic apparatus for reproducing designs upon sensitized surfaces, the combination of a lens, a holder for a sensitized surface, a plurality of frames each carrying a plurality of plates having designs thereon to be reproduced upon the sensitized surface, a register indicator, means for adjusting the plates on their frames to coincidence with respect to the register indicator, a support for each frame, said supports being adjustable to bring either frame into operative position at which position the successive plates of the adjusted frame may be brought into position before the lens, means for determining said adjusted position of each frame support, each frame being rotatively mounted on its support to bring its different plates into position before the lens, and means for determining the positions of the frames upon their supports at which the plates are brought into their formerly adjusted positions.

In testimony whereof, I have signed my name to this specification, in the presence of two subscribing witnesses.

HERBERT M. PILKINGTON.

Witnesses:
SAMUEL M. WARD, Jr.,
EDWIN SEGER.